US009862285B2

(12) United States Patent
Lee et al.

(10) Patent No.: US 9,862,285 B2
(45) Date of Patent: Jan. 9, 2018

(54) POST-TYPE APPARATUS FOR CONTAINING AND CHARGING UNMANNED VERTICAL TAKE-OFF AND LANDING AIRCRAFT AND METHOD OF CONTAINING AND CHARGING UNMANNED VERTICAL TAKE-OFF AND LANDING AIRCRAFT USING THE SAME

(71) Applicant: KOREA AEROSPACE RESEARCH INSTITUTE, Daejeon (KR)

(72) Inventors: Sang-Cherl Lee, Daejeon (KR); Hae-Dong Kim, Daejeon (KR); Hyeon-Cheol Gong, Daejeon (KR); Gi-Hyuk Choi, Daejeon (KR); In-Hee Hwang, Daejeon (KR); Byong-Suk Suk, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 580 days.

(21) Appl. No.: 14/556,296

(22) Filed: Dec. 1, 2014

(65) Prior Publication Data

US 2016/0347192 A1    Dec. 1, 2016

(30) Foreign Application Priority Data

Jul. 16, 2014    (KR) ........................ 10-2014-0090063

(51) Int. Cl.
*B60L 11/18*    (2006.01)
*B64C 39/02*    (2006.01)
(Continued)

(52) U.S. Cl.
CPC ........ *B60L 11/1824* (2013.01); *B64C 39/024* (2013.01); *B64F 1/00* (2013.01);
(Continued)

(58) Field of Classification Search
CPC .............. B60L 11/1824; B60L 2230/10; B60L 2200/10; B60L 2200/26; B60L 11/1816;
(Continued)

(56) References Cited

U.S. PATENT DOCUMENTS

| 4,123,020 | A | 10/1978 | Korsak |
| 7,538,688 | B1 * | 5/2009 | Stewart ................. E01F 13/028 116/63 C |
| 8,172,177 | B2 * | 5/2012 | Lovell ..................... B63B 27/10 244/110 F |
| 8,439,301 | B1 | 5/2013 | Lussier et al. |

(Continued)

FOREIGN PATENT DOCUMENTS

DE    102007003458 A1    7/2008
EP    2103518 A2    9/2009
(Continued)

*Primary Examiner* — Tien Q Dinh
*Assistant Examiner* — Vicente Rodriguez
(74) *Attorney, Agent, or Firm* — Rabin & Berdo, P.C.

(57) ABSTRACT

An apparatus and method for containing and charging an unmanned VTOL aircraft are disclosed. The apparatus for containing and charging an unmanned VTOL aircraft includes a post, an extended member, a cover, a fastening unit, and a charging unit. The post is placed on a ground. The extended member is connected to the post. The cover is provided on the extended member, and is configured to be opened or closed in order to contain and protect the unmanned VTOL aircraft. The fastening unit is provided in the cover, and is configured to fasten the unmanned VTOL aircraft. The charging unit is provided in the fastening unit, and is configured to charge the unmanned VTOL aircraft.

28 Claims, 13 Drawing Sheets

(51) Int. Cl.
*B64F 1/12* (2006.01)
*B64F 1/22* (2006.01)
*B64F 1/00* (2006.01)
*F21V 33/00* (2006.01)
*F21S 8/08* (2006.01)
*F21W 131/103* (2006.01)
*F21Y 115/10* (2016.01)

(52) U.S. Cl.
CPC ............... *B64F 1/005* (2013.01); *B64F 1/12* (2013.01); *B64F 1/222* (2013.01); *F21V 33/00* (2013.01); *B60L 2200/10* (2013.01); *B60L 2230/10* (2013.01); *B64C 2201/027* (2013.01); *B64C 2201/042* (2013.01); *B64C 2201/066* (2013.01); *B64C 2201/108* (2013.01); *B64C 2201/182* (2013.01); *B64C 2201/201* (2013.01); *F21S 8/086* (2013.01); *F21W 2131/103* (2013.01); *F21Y 2115/10* (2016.08)

(58) Field of Classification Search
CPC .. B60L 11/182; B60L 11/185; B60L 11/1835; B60L 11/1827; B60L 11/1809; B60L 11/1818; B60F 1/005; B60F 1/00; B64C 2201/201; B64C 2201/066; B64C 2201/20; A63H 27/14; G07C 5/008; H02J 7/0044
USPC .................................. 320/115; 191/1 R, 12.4
See application file for complete search history.

(56) References Cited

U.S. PATENT DOCUMENTS

| | | | |
|---|---|---|---|
| 8,453,966 B2* | 6/2013 | McGeer | B64C 25/68 244/110 C |
| 8,511,606 B1* | 8/2013 | Lutke | B64C 39/028 244/100 R |
| 9,174,747 B2* | 11/2015 | Kang | B64F 1/007 |
| 2002/0093564 A1* | 7/2002 | Israel | H04N 7/106 348/145 |
| 2006/0249622 A1 | 11/2006 | Steele | |
| 2007/0284912 A1* | 12/2007 | Klein | B62D 33/04 296/186.1 |
| 2008/0156932 A1 | 7/2008 | McGeer et al. | |
| 2009/0314883 A1* | 12/2009 | Arlton | B64C 39/024 244/63 |
| 2011/0150565 A1 | 6/2011 | Sapir | |
| 2011/0300738 A1* | 12/2011 | Hengel | B60L 11/1818 439/374 |
| 2012/0151851 A1* | 6/2012 | Cantin | E04B 1/34305 52/79.5 |

FOREIGN PATENT DOCUMENTS

| | | |
|---|---|---|
| EP | 2218642 B1 | 4/2014 |
| JP | 2014-040186 A | 3/2014 |
| KR | 10-2013-0122715 A | 11/2013 |
| KR | 10-2013-0122715 A | 11/2013 |
| WO | WO-98/02350 A1 | 1/1998 |
| WO | WO-2013/055265 A1 | 4/2013 |

* cited by examiner (a)

(b)

POST-TYPE APPARATUS FOR CONTAINING AND CHARGING UNMANNED VERTICAL TAKE-OFF AND LANDING AIRCRAFT AND METHOD OF CONTAINING AND CHARGING UNMANNED VERTICAL TAKE-OFF AND LANDING AIRCRAFT USING THE SAME

BACKGROUND

1. Technical Field

The present invention relates generally to an apparatus for containing and charging an unmanned vertical take-off and landing (VTOL) aircraft and, more particularly, to a post-type apparatus for containing an unmanned VTOL aircraft, which is configured in the form of a post and is provided with equipment capable of charging an unmanned VTOL aircraft in a state in which the unmanned VTOL aircraft has been contained in the apparatus, and a method of containing and charging an unmanned VTOL aircraft using the same.

2. Description of the Related Art

Recently, the utilization of unmanned VTOL aircraft in dangerous areas has increased, it is expected that the field of commercialization of unmanned VTOL aircrafts will further expand in the future. For example, it is expected that the utilization of unmanned VTOL aircrafts will increase in order to perform crime prevention, local patrol, traffic information collection. Therefore, there will be an increasing need for equipment for containing and charging an unmanned VTOL aircraft.

Korean Patent Application Publication No. 10-2013-0122715 discloses a conventional technology for containing an unmanned VTOL aircraft. This technology is configured in the form of a container vehicle that can move in order to charge an unmanned VTOL aircraft.

However, for an unmanned VTOL aircraft operating within a fixed area, it is more efficient to fixedly install and operate an apparatus for charging and containing an unmanned VTOL aircraft at a specific location, than to use moveable vehicle-type containing equipment. That is, since an unmanned VTOL aircraft that operates to perform crime prevention, local patrol, traffic information collection with equipment for containing and charging an unmanned VTOL aircraft, which is located at a specific location and contains and charges an unmanned VTOL aircraft, is required.

SUMMARY

Accordingly, the present invention has been made keeping in mind the above problems occurring in the prior art, and an object of the present invention is to provide an apparatus for containing and charging an unmanned VTOL aircraft in the form of a post that is fixed into the ground.

Additionally, there are other objects that are not explicitly mentioned in the description of the present invention and can be derived from the configuration of the present invention.

In accordance with an aspect of the present invention, there is provided an apparatus for containing and charging an unmanned vertical take-off and landing (VTOL) aircraft, comprising a post placed on a ground; an extended member connected to the post; a cover provided to the extended member, and configured to be selectively opened and closed in order to contain and protect the unmanned VTOL aircraft; a fastening unit provided inside the cover, and configured to fasten the unmanned VTOL aircraft; and a charging unit provided in the fastening unit, and configured to charge the unmanned VTOL aircraft.

Furthermore, a light emitting diode (LED)/Infrared (IR) pattern configured to identify a post to which the unmanned VTOL aircraft belongs is formed on an outside of the cover.

Furthermore, the apparatus further comprises a communication unit configured to communicate with the unmanned VTOL aircraft; and a status data monitoring unit provided in the charging unit, and configured to simultaneously perform charging and data exchange on the unmanned VTOL aircraft.

Furthermore, a LED lamp configured to normally function as a street light is mounted on a bottom of the cover.

Furthermore, a LED/IR illuminant is attached to the post in order to guide the unmanned VTOL aircraft through its return.

Furthermore, the cover comprises a plurality of portions, and each of the plurality of portions are rotated around a top of the cover and thus opened.

Furthermore, the charging unit comprises a reception hole configured such that a pole of the unmanned VTOL aircraft is inserted into the reception hole, an electrode connected to the pole inserted into the reception hole, and configured to charge the unmanned VTOL aircraft, and an electrode driving spring configured to push the electrode toward the pole.

Furthermore, the electrode and the electrode driving spring are disposed in each of a plurality of lateral holes that communicate with the reception hole.

Furthermore, in the apparatus, the pole comprises a plurality of rings that are disposed at predetermined intervals in a length direction of the pole; and an latch unit disposed in one of the plurality of lateral holes is configured to stop a bottom of any one of the plurality of rings, thereby preventing the pole from being removed from the reception hole in a state in which the pole has been inserted into the reception hole.

Furthermore, the apparatus further comprises an external fastening unit configured to fasten a side of the unmanned VTOL aircraft.

Furthermore, in the apparatus, the cover is opaque, and is configured to function as a surveillance camera and a light by attaching a camera and a LED lamp to an outside of the cover.

Furthermore, the cover is transparent, and is configured to be used as a surveillance camera by using a LED lamp and a camera that are attached to the unmanned VTOL aircraft fastened inside the cover.

Furthermore, a solar cell plate is installed on a top of the post, and charges the unmanned VTOL aircraft or powers a lamp for a street light.

Furthermore, strip-shaped LED/IR illuminants surrounding the post are disposed on an outside of the post at intervals so that the unmanned VTOL aircraft determines a height and a distance from the ground to the post via a vision, radar or IR sensor of the unmanned VTOL aircraft, thereby guiding the unmanned VTOL aircraft through fastening to perform charging day and night.

Furthermore, the communication unit can receive at least one of a GPS signal, a DGPS signal, and a beacon signal for position determination of the unmanned VTOL aircraft.

Furthermore, status data and a video and sensor data from the unmanned VTOL aircraft are transmitted in real time via the communication unit.

Furthermore, an entrance of the reception hole is formed in a cone shape, and thus the fastening of the unmanned VTOL aircraft is facilitated by lift of the unmanned VTOL aircraft and a slope of the cone shape during the fastening of the unmanned VTOL aircraft.

Furthermore, the fastening unit is further configured such that a target- and cross-shaped LED/IR light is lit in order to guide the unmanned VTOL aircraft through automatic insertion via vision of the unmanned VTOL aircraft.

Furthermore, the cover is further configured to be selectively opened and closed using any one of a method in which two opposite cover portions are selectively opened and closed and a method in which a plurality of cover portions is selectively opened and closed.

Furthermore, the charging unit is further configured to simultaneously perform charging and data exchange.

In accordance with another aspect of the present invention, there is provided an apparatus for containing and charging an unmanned VTOL aircraft, including a post placed on a ground; and at least one lateral fastening hole formed in a side of the post, and configured such that a pole of the unmanned VTOL aircraft is inserted and fastened into the lateral fastening hole; wherein an entrance of the lateral fastening hole is formed in a cone shape, and thus the pole of the unmanned VTOL aircraft is easily inserted into the lateral fastening hole during fastening of the unmanned VTOL aircraft; and wherein the lateral fastening hole is further configured such that target- and cross-shaped LED/IR lights are lit in order to guide the unmanned VTOL aircraft through automatic insertion via vision of the unmanned VTOL aircraft.

Furthermore, the pole is fixed not to move within the lateral fastening hole in a rolling direction so that the unmanned VTOL aircraft does not roll in a state in which the pole has been inserted into the lateral fastening hole.

Furthermore, the pole has an angled shape, and the lateral fastening hole has a shape corresponding to the angled shape. In accordance with still another aspect of the present invention, there is provided a method of containing and charging an unmanned VTOL aircraft at a post placed on a ground, the method including identifying, by an apparatus for containing and charging an unmanned VTOL aircraft, an unmanned VTOL aircraft over a long distance, and receiving, by the apparatus for containing and charging the unmanned VTOL aircraft, location information of the unmanned VTOL aircraft; guiding the unmanned VTOL aircraft to a nearby location; guiding the unmanned VTOL aircraft toward a cover through guidance of a LED/IR illuminant attached to the post; opening the cover in order to contain the unmanned VTOL aircraft; calculating a height or a distance from the post to the ground using the LED/IR illuminant attached to the post, and allowing the unmanned VTOL aircraft to approach a location immediately below the cover to perform charging and fastening when the unmanned VTOL aircraft detects an IR/LED light on the bottom of the cover via a camera attached to an end of a pole of the unmanned VTOL aircraft while performing X-Y axis turning flight in a safe area in which the unmanned VTOL aircraft does not collide with the ground below the cover; fastening the unmanned VTOL aircraft to a fastening unit of the apparatus for containing and charging the unmanned VTOL aircraft; and simultaneously performing charging and data exchange in connection with the unmanned VTOL aircraft in a state in which the unmanned VTOL aircraft has been fastened.

Furthermore, guiding the unmanned VTOL aircraft to a nearby location comprises guiding the unmanned VTOL aircraft to the nearby location by transmitting location information of a return point to the unmanned VTOL aircraft using the LED/IR illuminant of the post.

Furthermore, fastening the unmanned VTOL aircraft further comprises fastening the side of the unmanned VTOL aircraft using an external fastening unit.

Furthermore, the method further comprises charging the unmanned VTOL aircraft with power that is generated by a solar cell plate installed on a top of the post.

Furthermore, identifying the unmanned VTOL aircraft comprises receiving at least one of a GPS signal, a DGPS signal and a Beacon signal, and determining location information of the unmanned VTOL aircraft using the signal.

Furthermore, charging the unmanned VTOL aircraft comprises transmitting status data of the unmanned VTOL aircraft in real time.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
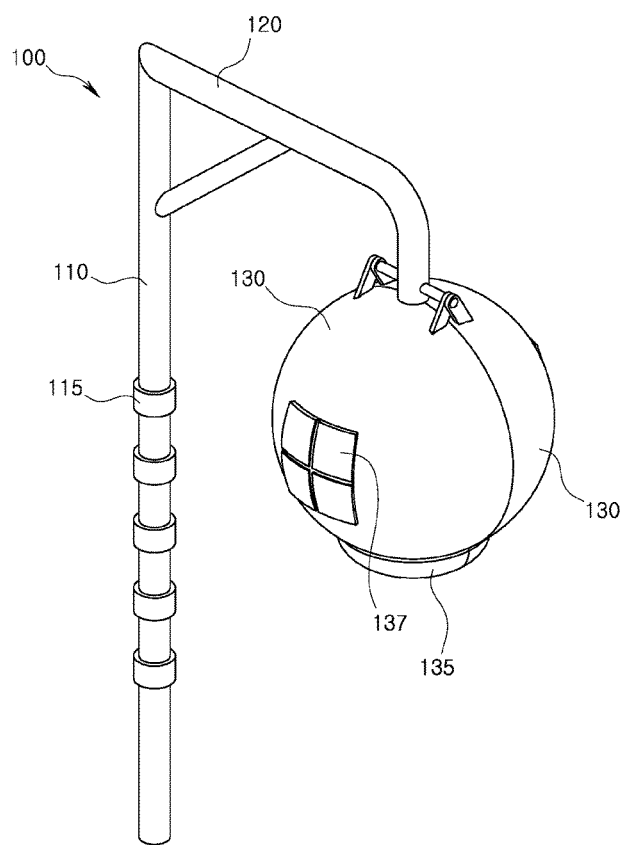
FIG. 1 is a perspective view illustrating the overall configuration of a post-type apparatus for containing and charging an unmanned VTOL aircraft according to an embodiment of the present invention.
Figure 2:
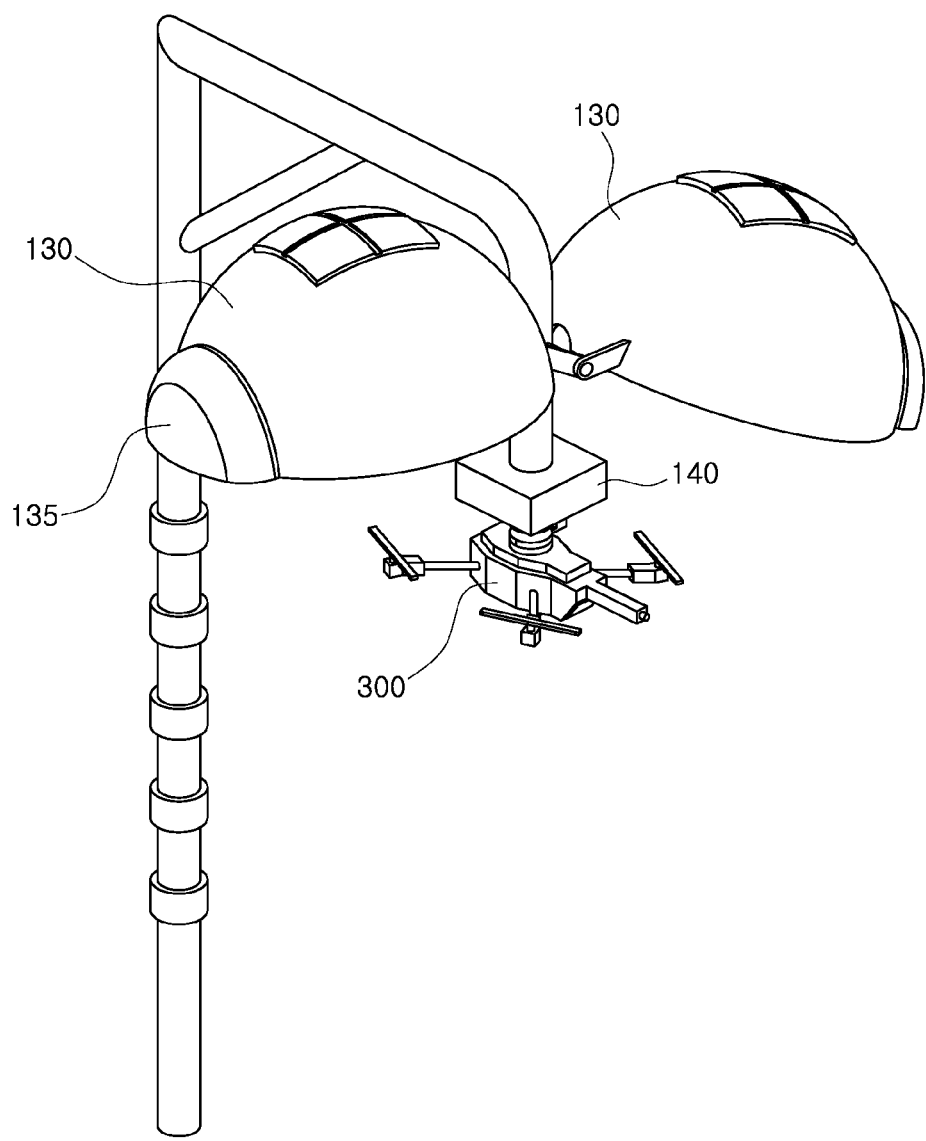
FIG. 2 is a diagram illustrating the open state of the post-type apparatus for containing and charging the unmanned VTOL aircraft according to the embodiment.
Figure 3:
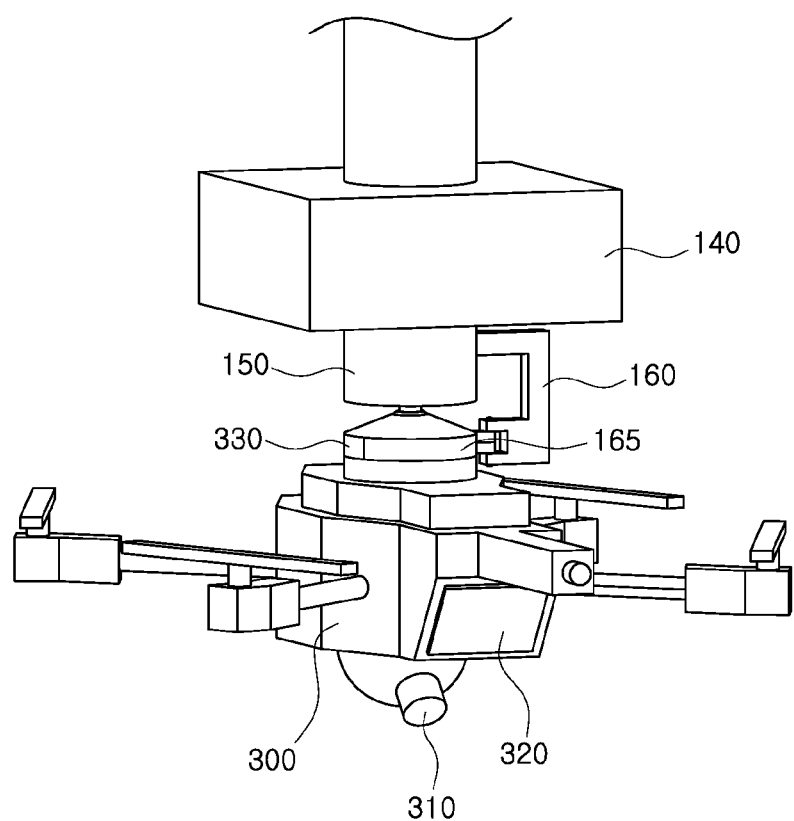
FIG. 3 is a diagram illustrating the fastening of the unmanned VTOL aircraft within the post-type apparatus for containing and charging the unmanned VTOL aircraft according to the embodiment.

Embodiments of the present invention are described with reference to the following drawings below so that a person having ordinary knowledge in the art can easily practice the present invention. In the following description of the present invention, if it is determined that a detailed description of a related well-known function or configuration may unnecessarily obscure the gist of the present invention, the detailed description is omitted. Furthermore, some features presented in the drawings may have been enlarged, reduced or simplified for ease of description. The figures and their components are not necessarily drawn to scale. However, details will be apparent to a person having ordinary knowledge in the art.

A post-type apparatus 100 for containing and charging an unmanned VTOL aircraft according to an embodiment of the present invention is described with reference to FIGS. 1 to 6.

The apparatus 100 for containing and charging the unmanned VTOL aircraft according to the present embodiment is equipment that is capable of charging an unmanned VTOL aircraft with electricity while accommodating and containing the unmanned VTOL aircraft.

The apparatus 100 for containing and charging the unmanned VTOL aircraft (hereafter referred to as the "containing and charging apparatus") according to the present embodiment includes a post 110 placed on the ground, and an extended member 120 connected to the post 110. A cover 130 is provided under the extended member 120, and is configured to be selectively opened and closed so as to contain and protect the unmanned VTOL aircraft (hereafter referred to as simply the "aircraft" or the "unmanned VTOL aircraft") 300.

A fastening unit 140 for fastening the unmanned VTOL aircraft 300 is provided within the cover 130. Furthermore, a charging unit 150 for charging the fastened unmanned VTOL aircraft 300 is provided to the fastening unit 140, and thus may charge the unmanned VTOL aircraft 300 in a fastened state. The unmanned VTOL aircraft 300 may be automatically fastened while being aware of the location of the reception hole 151 of the charging unit 150 by itself.

Furthermore, a particular type of light-emitting diode/infrared (LED/IR) pattern 137 is formed on the outside of the cover 130. The unmanned VTOL aircraft 300 may recognize the particular type of pattern 137, and thus may return to the containing and charging apparatus 100 to which it belongs. Furthermore, the cover 130 functions to protect the unmanned VTOL aircraft from an external environment, and also functions as a street light and a monitoring camera when the unmanned VTOL aircraft is not performing a mission.

The height and location of the unmanned VTOL aircraft are determined by the vision of the unmanned VTOL aircraft using the LED/IR pattern provided onto the post 110, and then the unmanned VTOL aircraft is guided toward a location below a cover 130.

Furthermore, the containing and charging apparatus 100 according to the present embodiment may include a communication unit for communicating with the unmanned VTOL aircraft 300, and thus performs required communication with the unmanned VTOL aircraft 300. The charging unit 150 may include a status data monitoring unit (not illustrated), and thus may monitor the status data of the unmanned VTOL aircraft 300 while charging the unmanned VTOL aircraft 300 in a state in which the unmanned VTOL aircraft 300 has been contained in the containing and charging apparatus 100.

Furthermore, a LED lamp 135 may be mounted on the bottom of the cover 130 of the containing and charging apparatus according to the present embodiment. The lamp 135 is usually lit and then illuminates an area below the lamp 135, and thus functions as a street light and also generates a specific pattern that guides the unmanned VTOL aircraft through hovering (perform stop flying) below the cover 130.

Furthermore, it is necessary to transmit the location information of the return point to the unmanned VTOL aircraft when the unmanned VTOL aircraft returns. For this purpose, a LED/IR illuminant 115 is attached to the post 110. That is, the LED/IR illuminant 115 transmits the location information of the return point to the unmanned VTOL aircraft, and thus guides the unmanned VTOL aircraft through its return.

A guidance-related configuration for guiding the unmanned VTOL aircraft 300 toward the containing and charging apparatus 100 determines the location of the unmanned VTOL aircraft while the unmanned VTOL aircraft is moving, and transmits the location information of the return point to the unmanned VTOL aircraft, thereby guiding the unmanned VTOL aircraft through its return. This process is performed chiefly via the LED/IR illuminant 115 attached to the post 110, a beacon signal, a Differential Global Positioning System (DGPS) receiver, or the like. The post-type containing and charging apparatus 100 for the unmanned VTOL aircraft uses a sensor in order to perform accurate fastening through an entirely automated process.

Figure 11A:
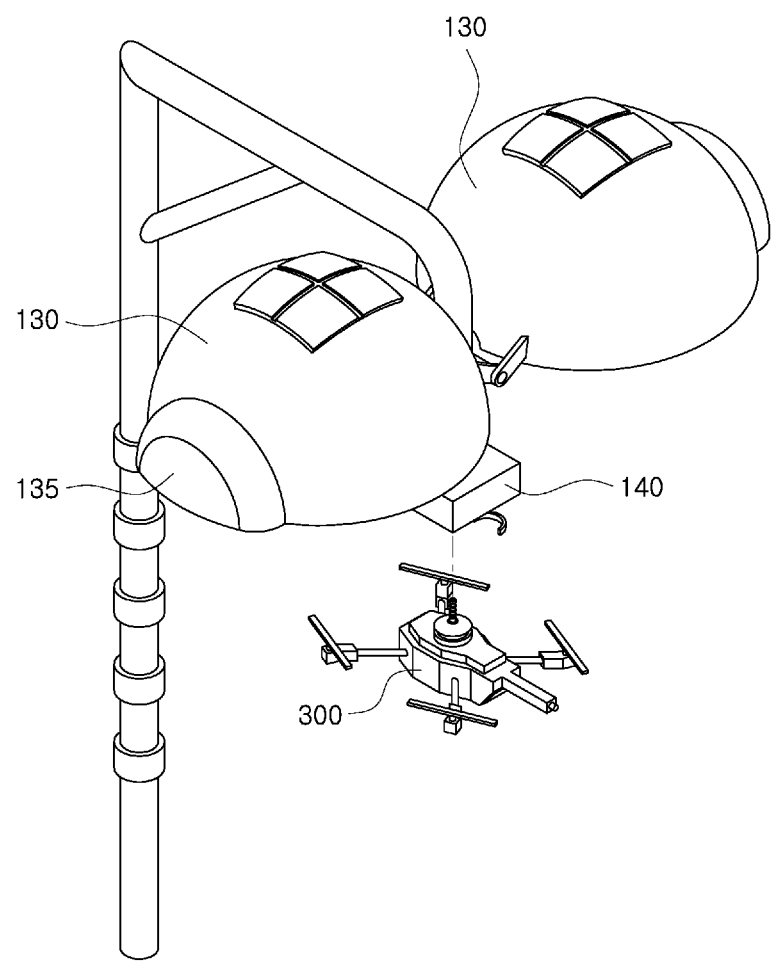
FIG. 11(A) and FIG. 11(B) are diagrams illustrating that the unmanned VTOL is approaching the post-type apparatus for the fastening.
Figure 11B:
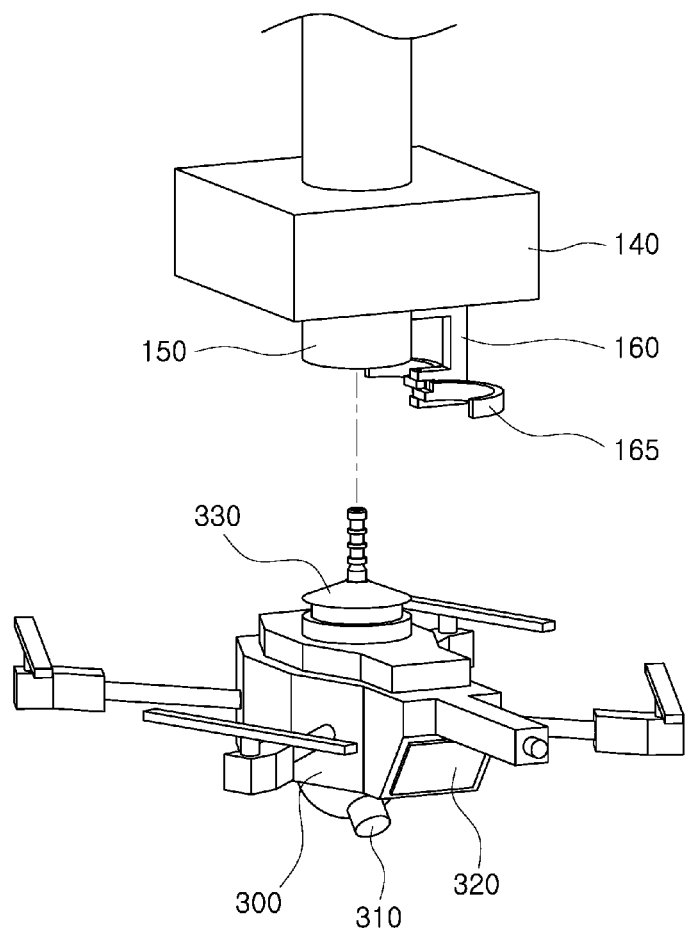

The cover 130 may has various shapes, such as a spherical shape, a pyramid shape, and a cubic shape. The cover 130 is illustrated in a spherical shape capable of reducing air drag in the drawings by way of example. If the unmanned VTOL aircraft approaches the containing and charging apparatus 100 in order to return (refer to FIG. 11), the containing and charging apparatus 100 should be opened. The cover 130 includes a plurality of portions. Each of the plurality of portions rotates and is opened around the top of the cover. The cover 130 may be divided into a plurality of portions. The cover 130 is illustrated as being divided into two portions in the drawings by way of example.

The unmanned VTOL aircraft 300 according to the present embodiment is an aircraft that patrols a specific area or performs activities for the purpose of crime prevention, traffic information collection or the like in an invisible place. The unmanned VTOL aircraft 300 includes a built-in camera, or includes a camera 310 on the bottom of the cover in order to photograph a surveillance area for the purpose of a patrol or a surveillance activity. Furthermore, the unmanned VTOL aircraft 300 further includes a LED lamp 320, thereby irradiating a specific area when needed.

That is, the unmanned VTOL aircraft 300 according to the present embodiment includes the LED lamp 320 and the camera 310, so that the unmanned VTOL aircraft 300 can light the lamp 320 to irradiate a front area when needed and can photograph a specific target area using the camera 310 and then transmit a photographed image to a control center, etc.

Figure 4:
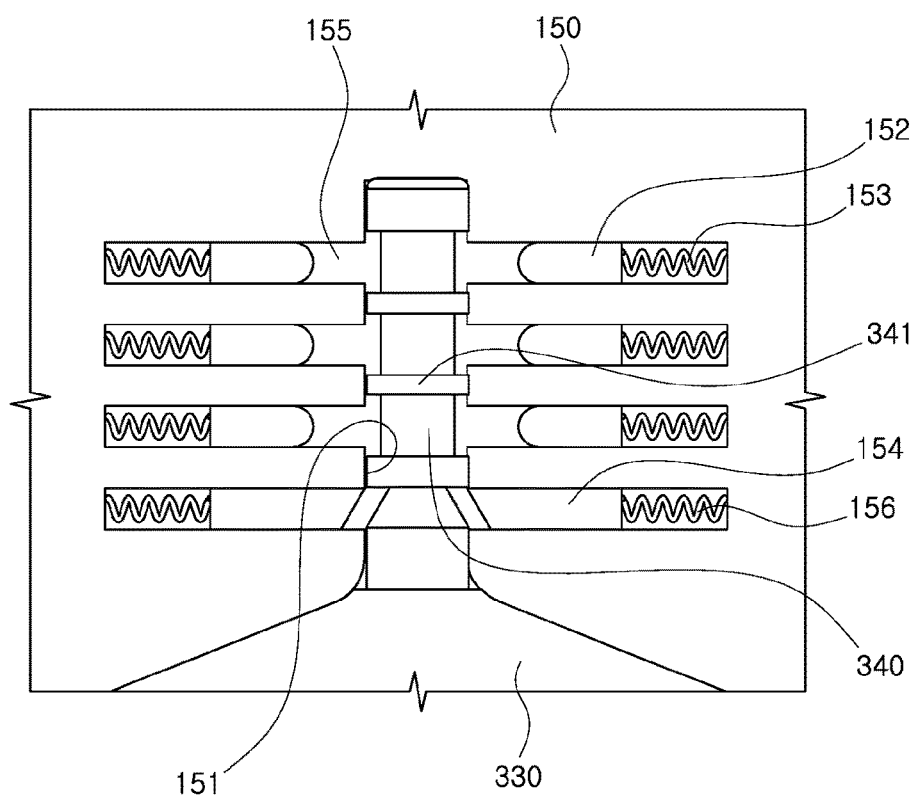
FIG. 4 is a diagram illustrating the charging/data exchange fastening of an unmanned VTOL aircraft that is achieved in a state in which the pole of the unmanned VTOL aircraft has been fastened into the post-type apparatus for containing and charging the unmanned VTOL aircraft according to the embodiment.

As illustrated in FIG. 4, the upper fastening portion 330 of the unmanned VTOL aircraft 300 includes a pole 340 that is inserted into the fastening unit 140 of the containing and charging apparatus and also enables charging. The pole 340 includes a plurality of rings 341 disposed at predetermined intervals in the lengthwise direction of the pole 340. Furthermore, metal strips for charging are installed on the pole 340. Furthermore, a vision sensor and a camera may be mounted at the top of the pole 340.

The charging unit 150 includes a reception hole 151 into which the pole 340 of the unmanned VTOL aircraft is inserted and mounted. The reception hole 151 is a vertical hole. Electrodes 152 are disposed in the reception hole 151, and come into contact with the pole 340 inserted into the reception hole 151, thereby enabling electric charging. An appropriate number of electrodes 152 are disposed and form a plurality of vertical layers, thereby enabling charging or data exchange in connection with the unmanned VTOL aircraft.

Furthermore, an electrode driving spring 153 is provided behind each of the electrodes 152. The electrode driving spring 153 applies force so that the electrode 152 is brought into contact with the pole 340 by pushing the electrode 152 toward the pole 340 in a state in which the pole 340 has been inserted. In this case, the electrode 152 and the electrode driving spring 153 may be disposed in each of a plurality of lateral holes 155 that communicate with the reception hole 151 in a lateral direction.

Meanwhile, the electrode 152 is connected with one end of the electrode driving spring 153. Furthermore, the electrode driving spring 153 is disposed in the lateral holes 155 while applying elasticity force enough to bring the electrode 152 into contact with pole 340. When the pole 340 is removed from the reception hole 151, the pole 340 may be smoothly removed thanks to the rounded shape of the ends of the electrodes 152 while pushing the rings 341 of the pole 340 toward the electrode driving spring 153. It will be apparent that the present invention is not limited thereto and may employ various types of means for the contact or release of the electrodes 152.

In order to ensure the fastening of the unmanned VTOL aircraft in a state in which the unmanned VTOL aircraft 300 has been contained in the containing and charging apparatus 100, the containing and charging apparatus 100 further includes an external fastening unit 160 that fastens the unmanned VTOL aircraft 300 on the side of the unmanned VTOL aircraft 300. By way of example, the external fastening unit 160 has a structure in which a ring 165 is divided into two parts and can be opened. The fastening of the unmanned VTOL aircraft 300 is further ensured in such a way that the ring 165 of the external fastening unit 160 fastens the unmanned VTOL aircraft 300 in the manner of being wrapped around the side of the unmanned VTOL aircraft 300 in a state in which the unmanned VTOL aircraft 300 has been fastened by the fastening unit 140.

Furthermore, the cover 130 according to the present embodiment may be made of opaque or transparent material.

Figure 12:
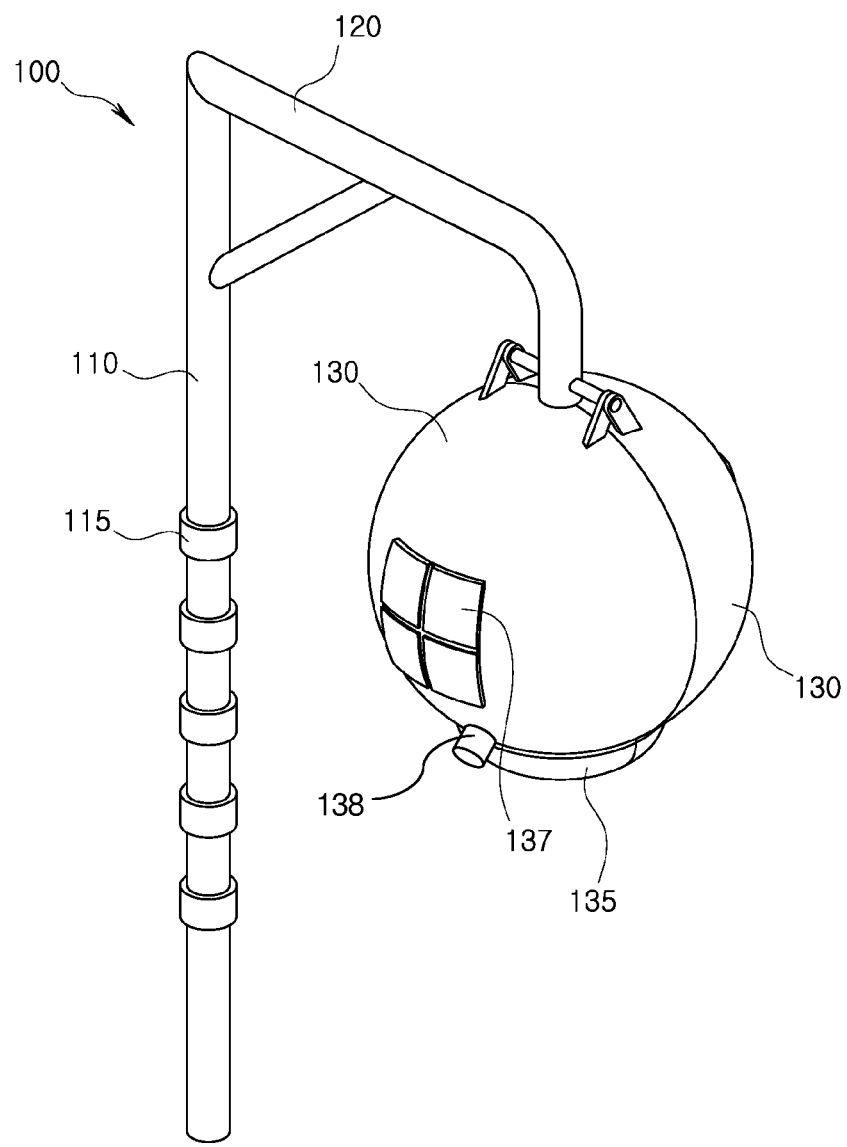
FIG. 12 is a perspective view illustrating the overall configuration of a post-type apparatus for containing and charging an unmanned VTOL aircraft in which a camera is attached to an outside of a cover.

If the cover 130 is made of opaque material, the cover 130 may be allowed to additionally function as a surveillance camera by attaching a camera 138 (FIG. 12) to the outside of the cover 130. That is, the containing and charging apparatus 100 according to the present embodiment may normally function as both a street light and a surveillance camera.

In contrast, if the cover 130 is made of transparent material, the cover 130 may be used as a surveillance camera using the LED lamp 320 and the camera 310 that are attached to the aircraft 300 fastened inside the cover 130. In other words, since photographing may be performed using the camera 310 provided in the unmanned VTOL aircraft 300 in a state in which the unmanned VTOL aircraft 300 has been fastened inside the cover 130, the containing and charging apparatus 100 may be allowed to function as the surveillance camera by using the feature.

A solar cell plate (not illustrated) may be installed on the top of the post 110. Electricity may be collected in the daytime using the solar cell plate, and then the unmanned VTOL aircraft 300 may be charged with the collected electrical energy or the collected electrical energy may be provided to the LED lamp 135.

Furthermore, the LED/IR illuminant 115 may be attached to the outside of the post 110, and may make the post 110 unique, thereby enabling the aircraft to identify the post 110 even during the night. A communication unit (not illustrated) provided in the containing and charging apparatus (for example, the post 110 or the fastening unit 140) is a means for position determination of the unmanned VTOL aircraft 300. The communication unit includes at least one of a global positioning system (GPS) receiver, a different GPS (DGPS) receiver, and a beacon signal. Status information and photographed image from the unmanned VTOL aircraft are transmitted in real time via the communication unit.

The fastening unit 140 is based on mechanical socket fastening. The fastening is performed by the fastening unit 140, and charging is performed simultaneously with the fastening. The fastening unit 140 includes a vision sensor, sonar and the like to perform fastening. The fastening unit 140 of the containing and charging apparatus according to the present embodiment may be configured to be rotatable. Furthermore, since the entrance of the reception hole 151 is formed in a cone shape, the fastening of the unmanned VTOL aircraft may be facilitated by the lift of the unmanned VTOL aircraft 300 and the slope of the cone-shaped entrance during the fastening. In greater detail, during the fastening of the unmanned VTOL aircraft, the upper pole 340 is inserted into the reception hole 151 while the unmanned VTOL aircraft 300 is generating lift and thus is vertically rising. In this case, the entrance of the reception hole 151 forms a conical slope, and thus fastening is achieved during the rise of the aircraft 300 attributable to lift even when the pole 340 is not accurately located at the center of the reception hole 151 and there is some offset.

A latch unit 154 disposed in any one of the plurality of lateral holes 155 stops the bottom of the ring 341 by the latch unit operating spring 156 when needed in a state in which the pole 340 has been inserted into the reception hole 151, thereby preventing the pole 340 from being removed from the reception hole 151.

Meanwhile, although the latch unit operating spring 156 has elastic force similar to the elastic force of the above-described electrode driving spring 153, the latch unit 154 moves in a direction away from the pole 340 according to the Faraday principle and thus the stopping is released when a current has been applied in a state in which the pole 340 has been inserted, so that the unmanned VTOL aircraft can be removed from the reception hole 151. It will be apparent that the present invention is not limited thereto and various types of means may be used to achieve the application or release of the latch unit 154.

Figure 5:
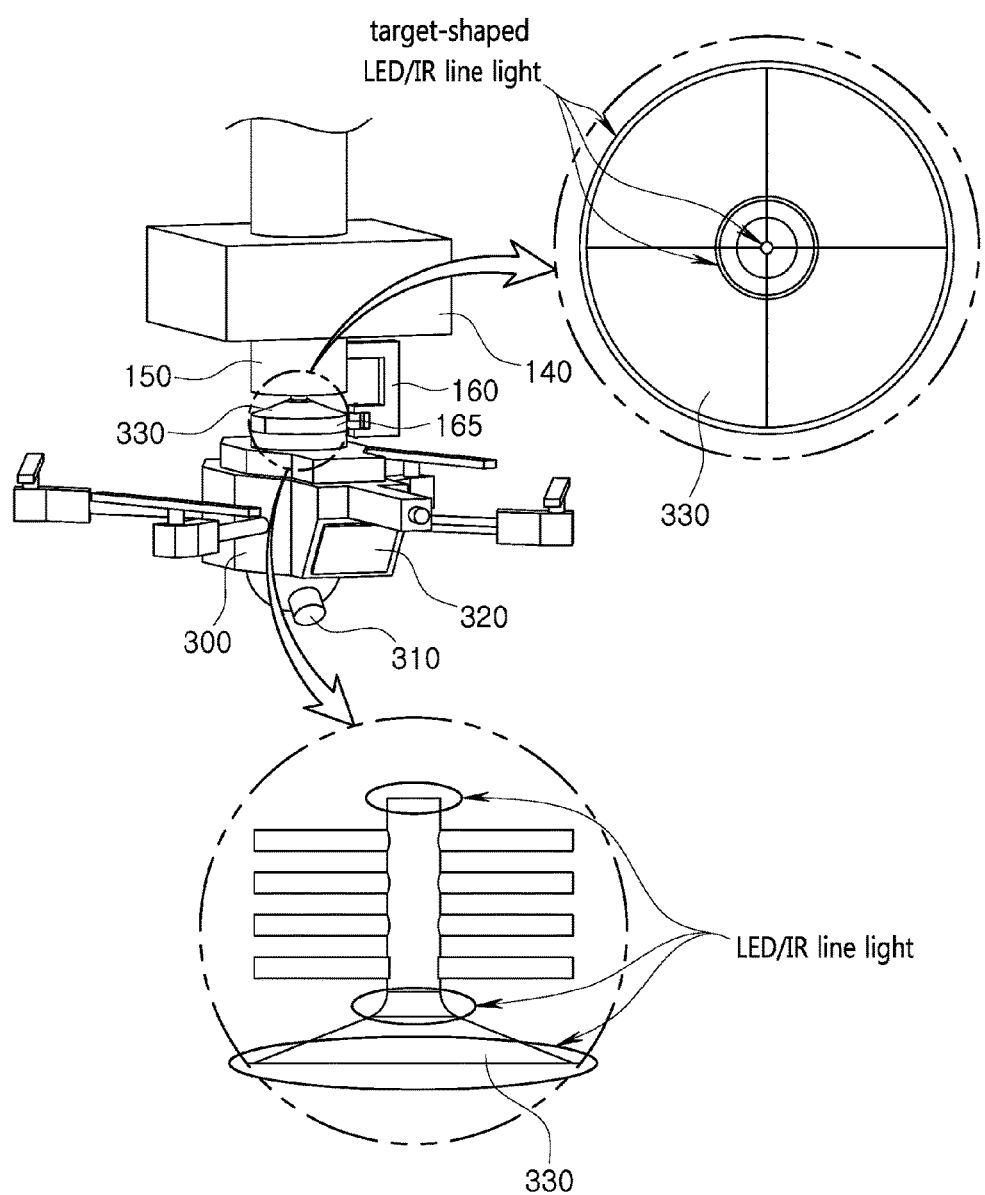
FIG. 5 is a diagram illustrating the arrangement of target- and cross-shaped LED/IR line lights that are used by the post-type apparatus for containing and charging the unmanned VTOL aircraft according to the embodiment in order to guide the unmanned VTOL aircraft.
Figure 6:
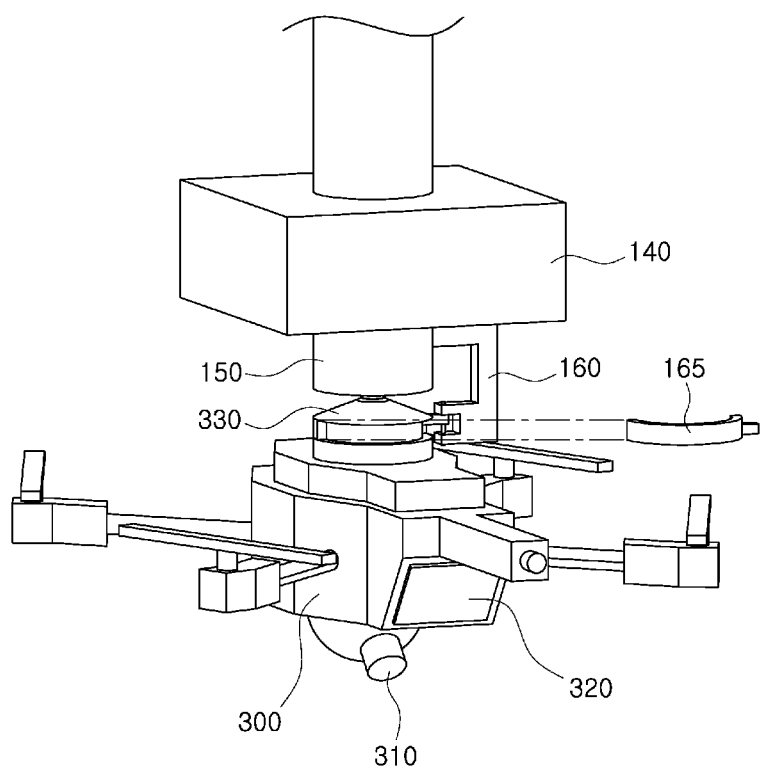
FIG. 6 is a diagram illustrating the external fastening unit of the post-type apparatus for containing and charging the unmanned VTOL aircraft according to the embodiment.

As illustrated in FIG. 5, in the fastening unit 140, a target-shaped IR LED is lit in order to guide the unmanned VTOL aircraft 300 through automatic insertion via the vision of the unmanned VTOL aircraft 300.

The cover 130 has a spherical shape, a cubic shape, or a pyramid shape. The cover 130 assumes a method in which two opposed left and right covers are opened or closed, or assumes a method in which a cover that can be divided into a plurality of parts is opened or closed. The charging unit 150 may perform charging and status data exchange.

A containing and charging apparatus according to another embodiment of the present invention is described below with reference to FIGS. 7 to 10.

The containing and charging apparatus according to the present embodiment is configured to accommodate one or more unmanned VTOL aircrafts on the side of the post 200, fasten the unmanned VTOL aircrafts to the side of the post 200, and simultaneously charge the unmanned VTOL aircrafts with electricity.

Figure 7:
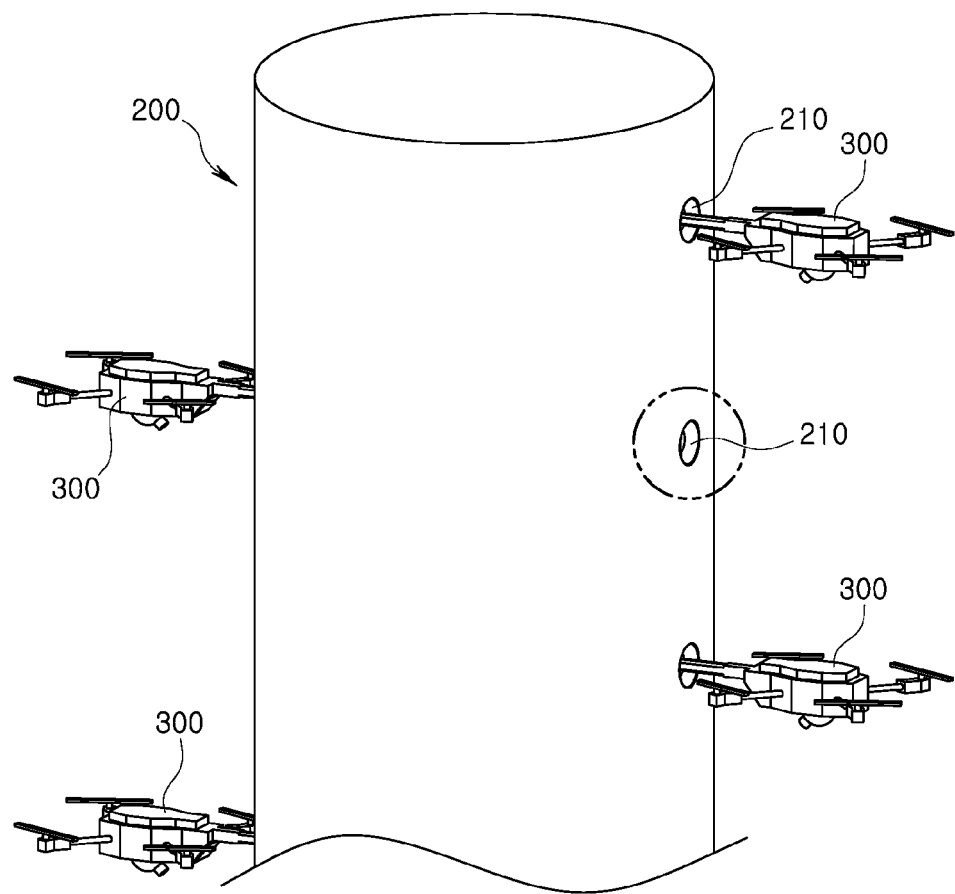
FIGS. 7 to 8 are diagrams illustrating a post-type apparatus for containing and charging an unmanned VTOL aircraft according to another embodiment of the present invention.

That is, as illustrated in FIG. 7, in the containing and charging apparatus according to present embodiment, one or more lateral fastening holes 210 are formed in the side of the post 200 placed on the ground.

Figure 9:
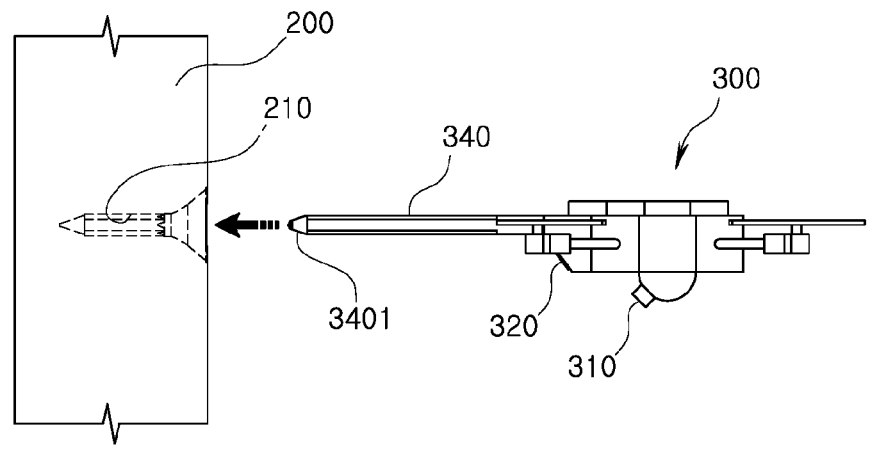
FIG. 9 is a diagram illustrating that the unmanned VTOL aircrafts is inserted into and fastened into each of the lateral fastening holes.
Figure 9:
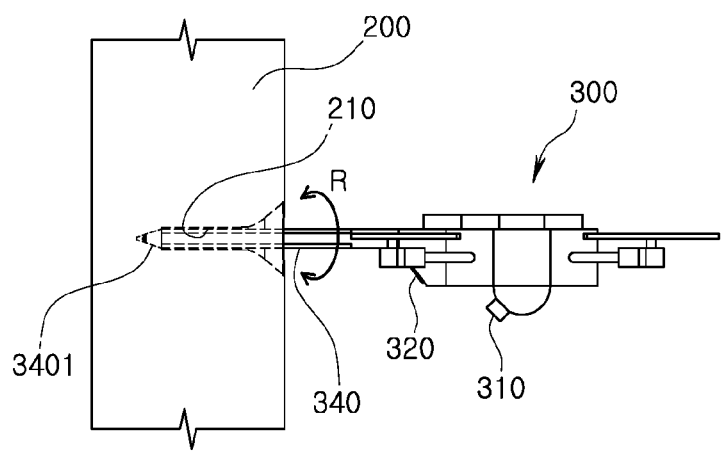

The pole 340 of each of the unmanned VTOL aircrafts 300 is inserted into and fastened into each of the lateral fastening holes 210. As illustrated in FIG. 9, the pole 340 of the unmanned VTOL aircraft 300 is formed to protrude from the front of the unmanned VTOL aircraft 300. A vision sensor and a camera may be mounted at front end 3401 of the pole 340. The pole 340 of the unmanned VTOL aircraft operates using a charging/fastening method identical to that of FIG. 4. Furthermore, an LED/IR strip (not illustrated) may be mounted on the pole 340, and thus the unmanned VTOL aircraft 300 may determine a height from the ground and a distance from the pole 340 by itself.

Figure 8:
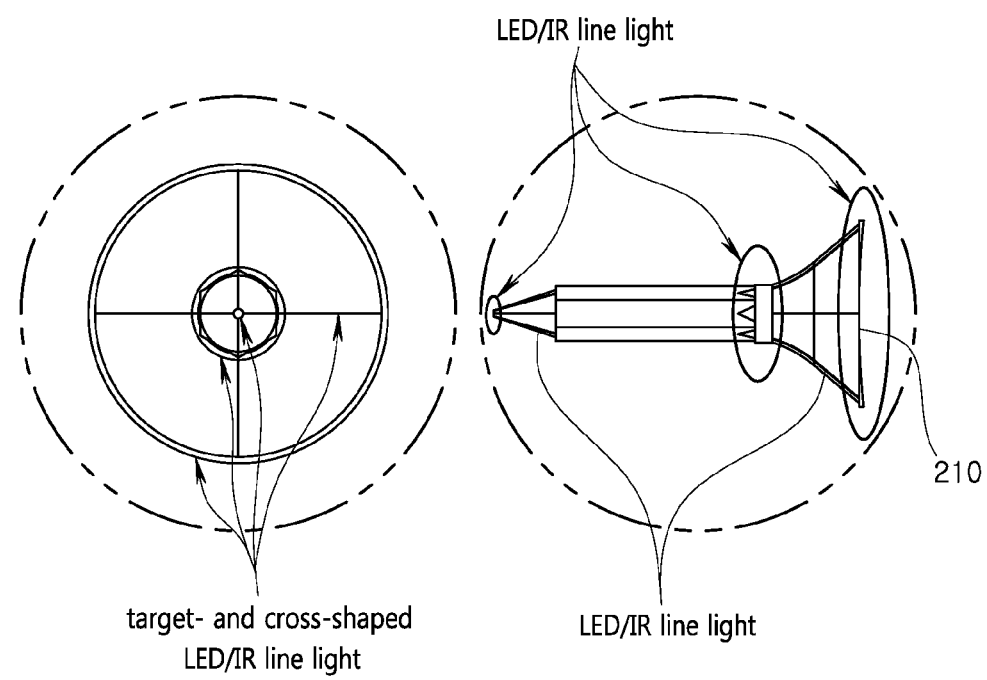

As illustrated in FIG. 8, since the entrance of the lateral fastening hole 210 is formed in a cone shape, the pole 340 of the unmanned VTOL aircraft 300 can be easily inserted into the lateral fastening hole 210 during the fastening of the unmanned VTOL aircraft 300.

Figure 10:
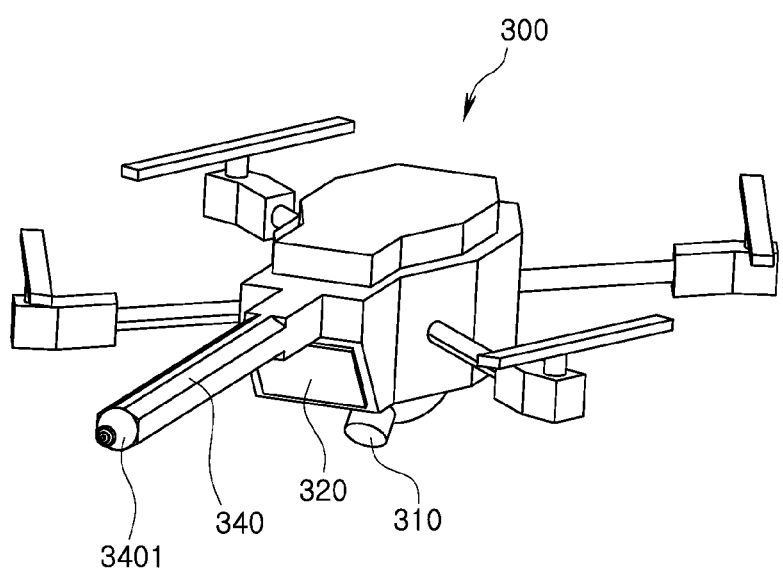
FIG. 10 is a diagram illustrating the pole 340 of an angled shape.

Meanwhile, the pole 340 is fixed not to move in the lateral fastening hole 210 in a rolling direction (see the direction R of FIG. 9B) so that the unmanned VTOL aircraft 300 does not roll in a state in which the pole 340 has been inserted into the lateral fastening hole 210. As illustrated in FIG. 10, the pole 340 may have an angled shape by way of example, and the lateral fastening hole 210 may have a corresponding shape.

Accordingly, the unmanned VTOL aircraft 300 may be charged in a state in which the rotor of the unmanned VTOL aircraft 300 is directed toward a sky direction (an upward direction in FIG. 9), that is, in a state in which the direction of the lift of the rotor corresponds to a direction opposite to the direction of gravity. If the pole 340 of the unmanned VTOL aircraft 300 is not fixed in a state in which the pole 340 has been inserted into the lateral fastening hole 210, the unmanned VTOL aircraft 300 may roll, and thus the direction of the rotor may be inverted. In this case, when the unmanned VTOL aircraft 300 is separated from the lateral fastening hole 210 and then performs flight again after the completion of the charging, the direction of gravity is identical to the direction of the lift of the rotor, and thus a problem may occur in that the unmanned VTOL aircraft 300 cannot perform flight.

Meanwhile, target- and cross-shaped LED/IR lights are lit within the lateral fastening hole 210 in order to guide the unmanned VTOL aircraft 300 through automatic insertion via the sensor of the unmanned VTOL aircraft 300. However, since this configuration is similar to the above-described configuration, a detailed description thereof is omitted for the sake of convenience.

A method of containing and charging an unmanned VTOL aircraft according to another embodiment of the present invention is described below.

The method according to the present embodiment includes a first step of identifying, by an apparatus for containing and charging an unmanned VTOL aircraft, an unmanned VTOL aircraft over a long distance, and receiving, by the apparatus for containing and charging the unmanned VTOL aircraft, the location information of the unmanned VTOL aircraft; a second step of transmitting the location information of the apparatus for containing and charging the unmanned VTOL aircraft 300 to the unmanned VTOL aircraft, and guiding the unmanned VTOL aircraft to a nearby location; a third step of guiding the unmanned VTOL aircraft toward a cover through the guidance of a LED/IR illuminant attached to the post; a fourth step of opening the cover in order to contain the unmanned VTOL aircraft; a fifth step of fastening the unmanned VTOL aircraft to a fastening unit of the apparatus for containing and charging the unmanned VTOL aircraft; and a sixth step of simultaneously performing charging and status data monitoring in connection with the unmanned VTOL aircraft in a state in which the unmanned VTOL aircraft has been fastened.

At the second step, the LED/IR illuminant 115 attached to the post 110 transmits the location information of a return point to the unmanned VTOL aircraft, thereby guiding the unmanned VTOL aircraft to a nearby location. The side of the unmanned VTOL aircraft is fastened using the external fastening unit 160. The unmanned VTOL aircraft is charged with power that is generated by the solar cell plate installed on the top of the post 110. Furthermore, the location information of the unmanned VTOL aircraft is received using at least one of a GPS signal, a DGPS signal and a beacon signal via the communication unit, and thus the location of the unmanned VTOL aircraft is determined.

Thereafter, at the fifth step, the status data and observational data of the unmanned VTOL aircraft are transmitted via the communication unit in real time.

A process of landing the unmanned VTOL aircraft is described briefly below.

1) When the unmanned VTOL aircraft is located at a long distance, the unmanned VTOL aircraft is guided by a GPS signal, a DGPS signal or a beacon signal. When the unmanned VTOL aircraft approaches a nearby location, the pole is identified via the LED/IR illuminant attached to the post.

2) When complete approach has been accomplished, the unmanned VTOL aircraft requests the opening of the cover, and thus the cover is opened.

3) The unmanned VTOL aircraft calculates the height or distance from the post to the ground using a LED/IR strip (illuminant) attached to the post, and performs X-Y axis turning flight in a safe area in which the unmanned VTOL aircraft does not collide with the ground below the cover. When the unmanned VTOL aircraft detects a LED/IR light on the lower portion of the cover via the camera attached to the front end of the pole of the unmanned VTOL aircraft, the unmanned VTOL aircraft approaches a location immediately below the cover to perform charging and fastening.

4) Position information, location information or the like are collected via the vision sensor or IR sensor. The distance from the fastening unit is measured using sound via the sonar.

Meanwhile, when the cover is opened, the unmanned VTOL aircraft 300 is dispatched in order to perform its mission and then the cover is closed again, the apparatus for containing and charging an unmanned VTOL aircraft functions as a street light and/or a surveillance camera. When the unmanned VTOL aircraft that has performed its mission returns, the cover is opened and the unmanned VTOL aircraft 300 is guided through containing. The charging of the unmanned VTOL aircraft 300 at the same time that the unmanned VTOL aircraft 300 fully fastened via various types of sensors installed on the apparatus for containing and charging an unmanned VTOL aircraft, and then the cover is closed again.

The present invention relates to a post-type apparatus for containing and charging an unmanned VTOL aircraft that performs missions, such as regular monitoring, local patrol, traffic information collection with expectations for an increase in the utilization of unmanned VTOL aircrafts and the active commercialization of unmanned VTOL aircrafts in the future. The object of the present invention is to provide a post-type apparatus for containing and charging an unmanned VTOL aircraft, which is capable of separating an unmanned VTOL aircraft in order to allow the unmanned VTOL aircraft to perform its mission after opening the cover containing the unmanned VTOL aircraft, fastening the unmanned VTOL aircraft to the post and then performing charging and status monitoring in connection with the unmanned VTOL aircraft when the unmanned VTOL aircraft has returned, and normally functioning as a street light and/or a monitoring camera, thereby reducing manpower and automatically performing the above-described task. Furthermore, the present invention also provides a post-type apparatus for containing and charging an unmanned VTOL aircraft, which is capable of fastening one or more unmanned VTOL aircrafts to a post and charging the unmanned VTOL aircrafts using the fastening portions provided on the fronts of the unmanned VTOL aircrafts. In order to achieve these objects, the post-type apparatus for containing and charging an unmanned VTOL aircraft according to the present invention includes various sensors for fastening, a power supply functioning to charging the unmanned VTOL aircraft and functioning as a street light, and a LED/IR illuminant for enabling the unmanned VTOL aircraft to identify the apparatus for containing and charging an unmanned VTOL aircraft, to which the unmanned VTOL aircraft belongs.

The post-type apparatuses for containing and charging an unmanned VTOL aircraft according to embodiments of the present invention are advantageous in that the task of containing an unmanned VTOL aircraft can be efficiently performed, the waste of manpower can be reduced by enabling an unmanned VTOL aircraft to be efficiently used, and the post-type apparatuses for containing and charging an unmanned VTOL aircraft can normally function as street lights and/or surveillance cameras.

Furthermore, the advantages of the present invention are not limited to the above-described advantages, and include advantages that can be derived from the detailed description of the present invention.

Although the preferred embodiments of the present invention have been disclosed in detail, the scope of the present invention is not limited thereto. Various medications and variations that are made by those skilled in the art based on the basic concept of the present invention defined in the attached claims also fall within the scope of the present invention.

What is claimed is:

1. An apparatus for containing and charging an unmanned vertical take-off and landing (VTOL) aircraft, comprising:
    a post placed on a ground;
    an extended member connected to the post, the extended member having a first portion connected to the post and a second portion extending from the first portion in a downward direction toward the ground;
    a cover opening towards the ground connected to the second portion of the extended member, and configured to be selectively opened and closed in order to contain and protect the unmanned VTOL aircraft;
    a fastening unit provided inside the cover, and configured to fasten the unmanned VTOL aircraft; and
    a charging unit provided in the fastening unit, and configured to charge the unmanned VTOL aircraft,
    wherein the charging unit includes a reception hole which is open to face the ground, such that a pole of the unmanned aircraft VTOL aircraft is inserted into the reception hole while the unmanned VTOL aircraft moves in a direction to increase height from the ground.

2. The apparatus of claim 1, wherein a pattern configured to identify a post to which the unmanned VTOL aircraft belongs is formed on an outside of the cover, and the pattern is one of a light emitting diode (LED) pattern and an infrared (IR) pattern.

3. The apparatus of claim 1, further comprising:
    a communication unit configured to communicate with the unmanned VTOL aircraft; and
    a status data monitoring unit provided in the charging unit, and configured to simultaneously perform charging and data exchange on the unmanned VTOL aircraft.

4. The apparatus of claim 1, wherein a LED lamp configured to normally function as a street light is mounted on a bottom of the cover.

5. The apparatus of claim 1, wherein a LED/IR illuminant is attached to the post in order to guide the unmanned VTOL aircraft.

6. The apparatus of claim 1, wherein the cover comprises a plurality of portions, and each of the plurality of portions are rotated around a top of the cover and thus opened.

7. The apparatus of claim 1, wherein the charging unit further comprises electrodes connected to the pole and configured to charge the unmanned VTOL aircraft, and electrode driving springs configured to push the electrode toward the pole.

8. The apparatus of claim 7, wherein the electrodes and the electrode driving springs are disposed in each of a plurality of lateral holes that communicate with the reception hole.

9. The apparatus of claim 8, wherein:
    the pole comprises a plurality of rings that are disposed at predetermined intervals in a length direction of the pole; and
    a latch unit disposed in one of the plurality of lateral holes is configured to stop a bottom of any one of the plurality of rings, thereby preventing the pole from being removed from the reception hole in a state in which the pole has been inserted into the reception hole.

10. The apparatus of claim 1, further comprising an external fastening unit configured to fasten a side of the unmanned VTOL aircraft.

11. The apparatus of claim 1, wherein the cover is opaque, and the apparatus further comprises a camera and a LED lamp attached to an outside of the cover.

12. The apparatus of claim 1, wherein the cover is transparent.

13. The apparatus of claim 1, wherein a solar cell plate is installed on a top of the post, and charges the unmanned VTOL aircraft or powers a lamp for a street light.

14. The apparatus of claim 1, wherein strip-shaped LED/IR illuminants are disposed on an outside of the post at intervals so that the unmanned VTOL aircraft determines a distance from the post via radar or IR sensor of the unmanned VTOL aircraft, thereby guiding the unmanned VTOL aircraft through fastening to perform charging day and night.

15. The apparatus of claim 3, wherein the communication unit can receive at least one of a GPS signal, a DGPS signal, and a beacon signal for detecting location information of the unmanned VTOL aircraft.

16. The apparatus of claim 3, wherein status information and a video data from the unmanned VTOL aircraft are transmitted in real time via the communication unit.

17. The apparatus of claim 7, wherein an entrance of the reception hole is formed in a cone shape, and thus the fastening of the unmanned VTOL aircraft is facilitated by lift of the unmanned VTOL aircraft and a slope of the cone shape during the fastening of the unmanned VTOL aircraft.

18. The apparatus of claim 1, wherein the fastening unit is further configured such that a target- and cross-shaped LED/IR light is lit in order to guide the unmanned VTOL aircraft.

19. The apparatus of claim 1, wherein the cover is further configured to be selectively opened and closed using any one of a method in which two opposite cover portions are selectively opened and closed and a method in which a plurality of cover portions is selectively opened and closed.

20. The apparatus of claim 1, wherein the charging unit is further configured to simultaneously perform charging and data exchange.

21. A method of containing and charging an unmanned VTOL aircraft at a post placed on a ground, the method comprising:
   identifying an unmanned VTOL aircraft at a long distance and receiving location information of the unmanned VTOL aircraft by an apparatus for containing and charging an unmanned VTOL aircraft;
   guiding the unmanned VTOL aircraft to a nearby location;
   guiding the unmanned VTOL aircraft toward a cover through guidance of a LED/IR illuminant attached to the post;
   opening the cover in order to contain the unmanned VTOL aircraft;
   allowing the unmanned VTOL aircraft to approach a location below the cover to perform charging and fastening when the unmanned VTOL aircraft detects an IR/LED light on a bottom of the cover via a camera attached to an end of a pole of the unmanned VTOL aircraft;
   fastening the unmanned VTOL aircraft to a fastening unit of the apparatus for containing and charging the unmanned VTOL aircraft; and
   performing charging and data exchange with the unmanned VTOL aircraft in a state in which the unmanned VTOL aircraft has been fastened.

22. The method of claim 21, wherein guiding the unmanned VTOL aircraft to a nearby location comprises guiding the unmanned VTOL aircraft to the nearby location by transmitting location information of a return point to the unmanned VTOL aircraft using the LED/IR illuminant of the post.

23. The method of claim 21, wherein fastening the unmanned VTOL aircraft further comprises fastening the side of the unmanned VTOL aircraft using an external fastening unit.

24. The method of claim 21, further comprising charging the unmanned VTOL aircraft with power that is generated by a solar cell plate installed on a top of the post.

25. The method of claim 21, wherein identifying the unmanned VTOL aircraft comprises receiving at least one of a GPS signal, a DGPS signal and a Beacon signal, and determining location information of the unmanned VTOL aircraft using the signal.

26. The method of claim 21, wherein charging the unmanned VTOL aircraft comprises transmitting status data of the unmanned VTOL aircraft in real time.

27. The apparatus of claim 1, wherein:
   the cover includes an inner surface and an outer surface, and when the cover is closed, the inner surface faces an inner space surrounded by the cover and the outer surface faces an exterior; and
   the cover comprises a plurality of portions, and each of the plurality of portions are rotated around a top of the cover, opening the cover from a bottom of the cover and exposing the inner surface of the cover to face the ground.

28. The apparatus of claim 1, wherein the reception hole is open at a bottom of the charging unit that faces the ground, and the reception hole extends in a vertical upward direction from the bottom of the charging unit to a depth.

* * * * *